United States Patent
Tietsch

(10) Patent No.: US 9,438,735 B2
(45) Date of Patent: Sep. 6, 2016

(54) PROCEDURE AND MECHANISM FOR MANAGING A CALL TO A CALL CENTER

(71) Applicant: Unify GmbH & Co. KG, Munich (DE)

(72) Inventor: Michael Tietsch, Kaufering (DE)

(73) Assignee: Unify GmbH & Co. KG, Munich (DE)

(*) Notice: Subject to any disclaimer, the term of this patent is extended or adjusted under 35 U.S.C. 154(b) by 0 days.

(21) Appl. No.: 14/250,731

(22) Filed: Apr. 11, 2014

(65) Prior Publication Data

US 2014/0307865 A1    Oct. 16, 2014

(30) Foreign Application Priority Data

Apr. 12, 2013  (DE) .................... 10 2013 006 351

(51) Int. Cl.
| | |
|---|---|
| *H04M 3/42* | (2006.01) |
| *H04M 3/523* | (2006.01) |
| *H04M 3/00* | (2006.01) |
| *H04L 12/66* | (2006.01) |

(52) U.S. Cl.
CPC ....... *H04M 3/5232* (2013.01); *H04M 3/42008* (2013.01); *H04M 3/42102* (2013.01); *H04M 2203/551* (2013.01)

(58) Field of Classification Search
CPC ......... H04M 3/5175; H04M 3/42221; H04M 3/523; H04M 2201/40; H04M 3/5183; H04M 3/51; H04M 2203/551; H04M 3/5191; H04M 3/42068; H04M 3/42161; H04M 3/00; H04M 3/5232; H04M 7/123; H04M 7/1275; H04M 3/5166
USPC ......... 379/265, 266, 210.01, 266.07, 265.02, 379/265.09, 266.01; 370/352, 353, 354, 370/355, 356, 357
See application file for complete search history.

(56) References Cited

U.S. PATENT DOCUMENTS

| | | | | |
|---|---|---|---|---|
| 5,907,597 | A  * | 5/1999  | Mark ......................... | 379/93.03 |
| 6,154,528 | A    | 11/2000 | Bennett, III et al. | |
| 6,314,089 | B1 * | 11/2001 | Szlam et al. .................. | 370/270 |
| 6,778,653 | B1   | 8/2004  | Kallas et al. | |
| 6,934,379 | B2   | 8/2005  | Falcon et al. | |
| 6,975,720 | B1 * | 12/2005 | Crook ....................... | 379/266.01 |
| 7,245,716 | B2   | 7/2007  | Brown et al. | |
| 7,734,032 | B1 * | 6/2010  | Kiefhaber et al. ....... | 379/265.01 |
| 8,804,944 | B1 * | 8/2014  | Hopkins .................. | 379/266.01 |

(Continued)

FOREIGN PATENT DOCUMENTS

| | | |
|---|---|---|
| EP | 1100250 A2 | 5/2001 |
| GB | 2477558 A  | 8/2011 |

(Continued)

*Primary Examiner* — Khai N Nguyen
*Assistant Examiner* — Kharye Pope
(74) *Attorney, Agent, or Firm* — Buchanan Ingersoll & Rooney PC

(57) ABSTRACT

In a method procedure for managing a caller's call to a call center with a call center agent, an agent is defined to receive the call and identified as the responsible agent for an incident assigned to the call. A relationship is created between the responsible agent and the incident. Then a token is generated that allows the relationship to be addressed without containing any individual connection or personal data for the responsible agent. The token is made available for the caller so the token can be activated when the caller resumes contact with the call center. The token causes the caller to be connected to the responsible agent or a proxy if the token is activated when contact is resumed.

18 Claims, 2 Drawing Sheets

(56) References Cited

U.S. PATENT DOCUMENTS

| | | | |
|---|---|---|---|
| 2002/0154757 A1* | 10/2002 | Hack | H04M 3/51 379/265.01 |
| 2005/0010461 A1* | 1/2005 | Manos | 705/8 |
| 2006/0262921 A1* | 11/2006 | Eppel et al. | 379/265.02 |
| 2007/0116185 A1* | 5/2007 | Savoor et al. | 379/9 |
| 2007/0133755 A1* | 6/2007 | Jean et al. | 379/1.01 |
| 2007/0165808 A1* | 7/2007 | Pieraccini et al. | 379/142.04 |
| 2007/0263838 A1* | 11/2007 | Wiseman | H04M 3/5166 379/265.02 |
| 2008/0037764 A1* | 2/2008 | Lee | H04M 3/12 379/266.01 |
| 2008/0080506 A1* | 4/2008 | Kelly | H04M 3/5237 370/392 |
| 2008/0228504 A1* | 9/2008 | Nguyen et al. | 705/1 |
| 2009/0067612 A1* | 3/2009 | Chevalier | H04M 3/5191 379/265.09 |
| 2009/0077176 A1* | 3/2009 | Shae et al. | 709/204 |
| 2009/0190750 A1 | 7/2009 | Xie et al. | |
| 2009/0232294 A1 | 9/2009 | Xie et al. | |
| 2009/0285385 A1* | 11/2009 | Dunbar | H04M 3/523 379/266.01 |
| 2010/0027778 A1 | 2/2010 | Kumar et al. | |
| 2010/0086108 A1* | 4/2010 | Jaiswal et al. | 379/88.04 |
| 2010/0104086 A1* | 4/2010 | Park | G10L 15/04 379/265.09 |
| 2010/0158236 A1* | 6/2010 | Chang et al. | 379/265.03 |
| 2010/0279716 A1* | 11/2010 | Benco | H04L 12/5895 455/466 |
| 2011/0078514 A1* | 3/2011 | Scrafford et al. | 714/48 |
| 2011/0103572 A1* | 5/2011 | Blair | 379/265.06 |
| 2012/0077472 A1 | 3/2012 | Timmins et al. | |
| 2012/0143634 A1* | 6/2012 | Beyda et al. | 705/4 |
| 2012/0224681 A1 | 9/2012 | Desai et al. | |
| 2012/0320905 A1* | 12/2012 | Ilagan | 370/352 |
| 2013/0244632 A1* | 9/2013 | Spence | H04M 3/51 455/415 |
| 2014/0106721 A1* | 4/2014 | Calman et al. | 455/416 |
| 2014/0161241 A1* | 6/2014 | Baranovsky | H04M 3/51 379/142.05 |
| 2014/0161249 A1* | 6/2014 | Tolksdorf | 379/266.1 |

FOREIGN PATENT DOCUMENTS

| | | |
|---|---|---|
| GB | 2481451 A | 12/2011 |
| WO | 98/23062 | 5/1998 |

* cited by examiner

PROCEDURE AND MECHANISM FOR MANAGING A CALL TO A CALL CENTER

FIELD OF INVENTION

The invention relates to a procedure and mechanism for managing a call to a call center.

BACKGROUND OF THE INVENTION

The use of call centers to centrally manage customer contact for a company has become more prevalent in recent decades. Call centers are used for various purposes, e.g., acquiring contracts, accepting orders and contracts, technical support, complaint management, emergency services, opinion research, disclosure, and information, to name just a few. For the purposes of this application, employees of a call center in contact with the customer are called agents. The call center agents generally have a workstation and a headset. The connection to the telephone network is established using a Private Branch Exchange (PBX). Increasingly, calls are also connected via the Internet using Voice over Internet Protocol (VoIP).

For example, in the case of a service hotline, it is common for a customer to have to call multiple times before a problem ("incident") can be solved. In many cases, it is even known in advance/anticipated that subsequent calls will be necessary. In such cases it is desirable—at least from the customer's perspective—for these calls to be directed to the hotline employee (agent) to whom the incident was reported during the first call. Since this agent knows the history and can resume the process seamlessly, the most effective help can be expected. This ideal situation cannot always be implemented optimally.

Optimal call distribution is very important for the operator of a call center to balance customer satisfaction and cost-effectiveness (utilization). One means to improve efficiency is Interactive Voice Response (IVR). This has the customer navigate through a series of IVR queries (either voice or numerical input) until he or she reaches the desired department. The customer will often be connected to the next available agent. This is the same for every call, regardless of whether it is the very first call or a follow-up call. This means that the customer will usually end up with a different agent than the initial agent with whom he or she spoke. The customer will then have to re-explain who he or she is, provide the customer number, etc., and explain the issue again. For complex incidents that are not fully resolved initially, the randomly connected agent might attempt to connect the customer with the agent that previously handled the incident. However, since this agent is frequently speaking to another customer, this can delay considerably the whole process, decreasing efficiency, and not least, it can leave the customer with a negative impression of the experience.

Computer Telephony Integration (CTI) can improve the process. The customer is identified using the incoming telephone number or by having the customer enter the account number or a PIN in the IVR system. This allows the customer history to be displayed on the agent's monitor at the start of the conversation. The agent thus has knowledge of the incidents that the caller has already discussed with other employees, and does not have to ask the customer about them again, or consult with the other agent(s). This speeds up the process considerably (time savings). The perceived service quality, however, is dependent on the documented history—ultimately the fields that were filled out by the supervisor or project manager. It also takes time for the newly connected agents to get a picture of the customer history.

It would be favorable to always reach the same agent when handling an incident, or at least a proxy, who will then have the same access to the documentation on the incident.

However, one significant constraint makes this hard to implement: namely, it is often undesirable for an agent to be called directly at will, which is why his or her personal contact data (telephone number/extension) is not (or may not) shared with the caller. The opposite can also occur, i.e., the caller would like to remain anonymous. Examples of this include crisis hotlines and the police (e.g., emergency call hotlines). Applications like crisis hotlines can even require both sides to remain anonymous. Police applications could include a witness who wants to remain anonymous, but would like to provide information on an open case, and who would like to always be connected directly to his or her contact without having to remember a special number. Special solutions can also fail when callers frequently contact the call center using a variety of different devices (landline phone, pay phone, cell phone, PDA, PC, etc.).

SUMMARY OF THE INVENTION

One object of this invention is to overcome the disadvantages of the current technology, at least in part. One particular object of this invention is to create a procedure and a mechanism for managing a call or calls to a call center that enable a caller to always reach the same agent or a proxy when handling an incident, while keeping the agent anonymous to the caller. Another object of the invention is to create a procedure and a mechanism for managing a call or calls to a call center that enable caller to always reach the same agent or a proxy when handling an incident, while keeping the caller anonymous to the agent.

One factor of the invention proposes a procedure for managing a call from a caller to a call center with the following steps:

Defining a call center agent to receive the call as the responsible agent for an incident assigned to the call.

Creating a relationship between the responsible agent and the incident.

Generating a token that allows the relationship to be addressed without containing any individual connection or personal data of the responsible agent.

Making the token available for the caller so that the token can be activated when the caller resumes contact with the call center.

Connecting the caller with the responsible agent or a proxy if the token is activated when contact is resumed.

For the purposes of this invention, a call center is considered an organizational unit of a company with numerous telephone workstations that can be reached via a central telephone number or URL. For the purposes of this invention, an agent is considered an employee of the call center who uses one of the various telephone workstations. An incident is considered the subject or situation that is the reason for the call and is discussed during the call. The agent receiving the call—who is defined as the responsible agent—can be the first agent familiar with the incident. It could also be another agent, either because the first agent is unavailable for a longer period, because there is lasting resentment between the first agent and the caller, or for other reasons. For the purposes of the invention, a relationship is considered a data structure containing information enabling an association between the responsible agent and the incident. A token is considered a data structure that enables the relationship to be addressed within the call center, and thus the identification of the responsible agent and the incident. The token can contain other information, like header or completion data, functional properties, etc. Connection or personal data for the responsible agent can include all data that enables a direct assignment to a specific agent within the telephone network or the company structure of a call center operator, like the extension, department, working group, name, personnel number, etc. For the purposes of the invention, activation of the token is considered accessing the relationship using the token. Resuming contact is considered another call, in particular. However, it is conceivable for it to also be the call center calling back the original caller with his or her permission, or through an automated process. Making the token available, and thus the addressing (concealed to the caller) of the relationship between the incident and the responsible agent, and the subsequent connection of the caller with the responsible agent allows for a caller to always reach the same agent or a proxy when handling an incident, while keeping the agent anonymous to the caller.

In a preferred embodiment of the invention, the step of making the token available includes the transmission of the token to a caller terminal, whereupon the activation of the token includes a return transmission of the token to the call center. With this embodiment, the token can be activated on the terminal making the call. This can utilize features of the respective terminal to make it as easy as possible for the caller to access the relationship between the incident and the responsible agent.

In a preferred design of this embodiment of the invention, the token is transmitted in the form of a cookie, whereupon the cookie is saved on a caller terminal. The return transmission of the token contained in the cookie to the call center is preferably handled automatically when the caller calls the call center again. For the purposes of the invention, a cookie is considered a file that is intended to be saved to the caller terminal. A cookie generally contains functional contents, like contents that control a self-activation of certain functions of the cookie when certain conditions occur without the assistance of the person using the terminal.

Another preferred design transmits the token in the form of an SMS, whereupon an SMS can be sent to the call center as a reply to activate the token. This can also include a mechanism, whereupon a reply to the SMS will trigger a call back to the caller from the call center.

Yet another preferred design transmits the token to a caller terminal as a character string in a form that can be seen or heard, whereupon the caller can initiate the return transmission of the token when calling the call center again by entering the character string in text form or by speaking it at the caller terminal. In other words, the token contains a character string that is shown on the telephone's display or read to the reader by the agent or a speech synthesis system. When the caller calls again, this character string is entered at the caller terminal (selected, typed). This allows the procedure to be implemented even on simple terminals.

In an advantageous refinement of the invention, the token contains a special phone number that the caller can select when calling again.

In an alternative preferred embodiment of the invention, the step of making the token available includes the following steps:

Generating the token in the form of a specific voice token to remain at the call center.

Prompting the caller to save a voice sample, whereupon the voice sample contains a passphrase specified to the caller or selected by the caller.

Saving the stored voice sample together with a link to the voice token at the call center.

The step of activating the token includes the following steps:

Requesting the passphrase from the caller when calling again.

Selecting the link to the voice token at the call center if the passphrase spoken by the caller matches the stored voice sample when calling again.

A voice token is considered a token that can be activated by transmitting and verifying voice samples. This embodiment can implement the procedure regardless of the terminal and the caller's respective call situation. The complete anonymity of the caller can also be maintained.

An advantageous refinement of the invention will transmit information on the incident to the responsible agent or the proxy upon activation of the token when contact resumes. This provides the agent or proxy with immediate access to the documentation on the incident without further assistance.

Another advantageous refinement of the invention invalidates the token if the incident is marked as closed. This could also allow the agent to manually invalidate the token. Preferably, the invalidation will observe a waiting period, either preset or chosen by the agent. An invalidation is considered marking the token as invalid, deleting the token, etc. When the token is deleted by the call center system or marked invalid, if this token is invoked during a subsequent call, the call will be treated as though no token were activated. It will be directed to the queue as normal. In cases where the token was stored on the caller terminal, the token can also be automatically deleted from the caller terminal so the token can no longer be activated when calling again. Manual invalidation can be desirable, for example, if the responsible agent is subjected to personal harassment or insults. For the purposes of this invention, a waiting period means that the invalidation is marked, but it will not go into effect until the waiting period has elapsed. This provides the option for a customer to ask follow-up questions for a certain period even if the incident is closed, and be connected with the same agent.

Another factor of this invention is a proposed mechanism for managing a caller's call to a call center that is designed and equipped to connect a call from at least one remote communication network to multiple agent workstations. According to the invention, the mechanism is designed and equipped to execute the steps of the procedure described above. The function of this invention is solved by this mechanism for the same reasons as specified above for the respective procedure. The mechanism for executing the procedure can be a known and available, specially programmed device like a router, a telephone system, a server, etc., a specially provided and configured device, or a local network including functionalities distributed among multiple devices to execute individual steps of the procedure.

It is recognized that the procedure according to the invention can also be embodied in a computer program, comprehensive program commands that prompt a computer to execute the steps of the described procedure when the computer program is loaded on the computer or executed by it; in a software product stored on a medium that can be read by a computer, and that preferably can be loaded directly into the internal memory of a computer, and features the program code to perform the steps of the described procedure when the computer program is executed on the computer; or in a digital storage medium with electrically readable control signals that can work with a programmable computer to manage communication processes, whereupon the control signals are configured and modified to prompt the computer to execute the steps of the described procedure.

Other characteristics, functions, advantages, and details of this invention will be made even clearer in the description below with concrete exemplary embodiments and their graphical representation in the included figures. It is recognized that characteristics, features, advantages, and details of individual exemplary embodiments are transferable, and should also be considered disclosed in relation to the other exemplary embodiments, as long as they are not clearly groundless for technical or physical reasons. Exemplary embodiments can be combined with one another, and the combination can also be considered an exemplary embodiment of the invention.

The figures are only schematic and are not necessarily true to scale. The drawings and descriptions of them are only intended to be exemplary demonstrations of the principle of the invention, and they should not limit it in any way.

DESCRIPTION OF THE PREFERRED EMBODIMENTS

Figure 1:
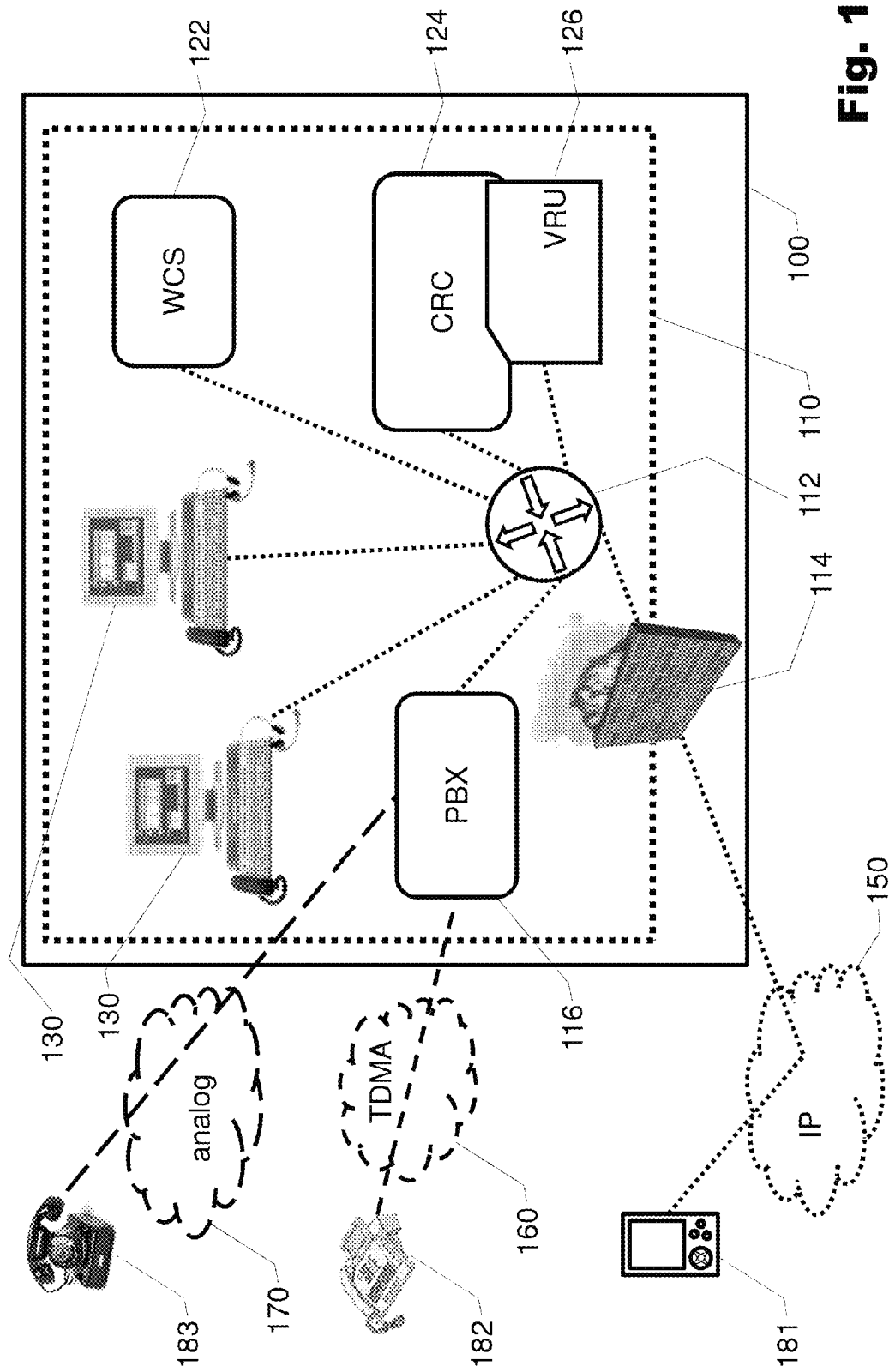
FIG. 1 is a schematic diagram of a call center with a local network and some external instances.

FIG. 1 shows a schematic diagram of a call center 100 with a Local Area Network (LAN) 110 and some external instances from a physical perspective.

According to the diagram in FIG. 1, the LAN 110 of the call center 100 has a router 112 based on the Internet Protocol (IP). The router 112, which is also identified as a layer 3 switch, is the central distribution point for all data streams in the LAN 110. Preferably layer 3 is the network layer according to the OSI model (OSI: Open Systems Interconnection Reference Model). A firewall 114, a telephone exchange system (PBX—Private Branch Exchange) 116, which in this example is implemented as a gateway or encompassing a gateway, a Workflow Control System (WCS) 122, a Call Relationship Controller (CRC) 124, a Voice Recognition Unit (VRU) 126, and numerous agent workstations 130 are connected with the router 112 via IP connections and thus connected to each other within the LAN 110. The VRU 126 is assigned to the CRC 124 in this exemplary embodiment, but it can also act independently or be assigned to another unit within the LAN 110. The CRC 124, and the VRU 126 can also each be directly connected to the telephone exchange system 116 without passing through the router 112 (not shown). At least one agent workstation 130, the CRC 124 and the WCS 122 can also be connected directly to one another, i.e., without passing through the router 112 (not shown).

The router 112 is connected via the firewall 114 to an external network (the Internet in this case) 150.

The telephone exchange system 116 is connected to one or more telephone networks, like a Time Division Multiple Access (TDMA) network 160 and an analog telephone network 170. An IP terminal (smartphone) 181 connected to the Internet 150, a TDMA terminal (telephone) 182 connected to the TDMA network 152, and an analog terminal (telephone) 183 connected to the analog telephone network 153 are shown to represent a variety of communication devices. A variety of other terminals can be connected to the Internet 150, the TDMA network 160, or the analog telephone network 170, depending on their switching technology. In a switching environment that only has a TDMA network 160 available, analog terminals can connect directly to the TDMA network 160 via local signal converters (not shown in detail). This example does not include a connection between the telephone exchange system 116 and an analog telephone network.

The telephone exchange system 116 provides conversion services from analog and digital (particularly TDMA) telephone signal transmission formats to the packet-based Internet Protocol (IP). The WCS 122, the CRC 124, and the VRU 126 can be separate computing units or services that are combined into or installed on one computing unit (e.g., a central server). The central server can also include the telephone exchange system 116. The agent workstations 130 are equipped with a computing unit and peripherals connected to it, namely a monitor, a keyboard, a computer mouse, and a headset. The computing units for the agent workstations 130 can be fully equipped workstation computers or client computers that access applications on a central server.

Figure 2:
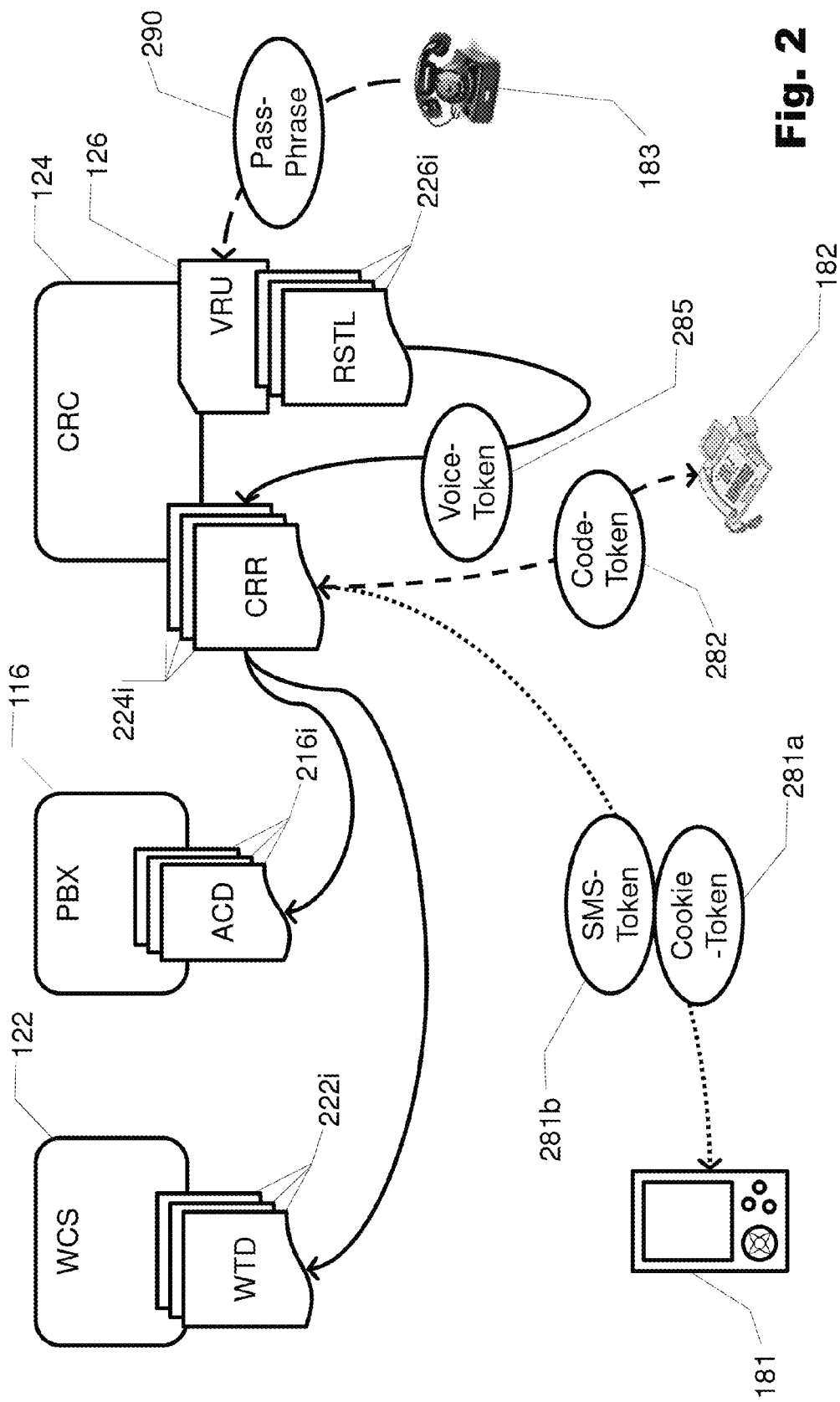
FIG. 2 is a schematic diagram of some components of the local network and the external instances in more detail, and with functional or procedural contexts.

FIG. 2 shows some components of the LAN 110 and external instances in more detail, and with functional or procedural contexts.

According to the diagram in FIG. 2, the WCS 122 is assigned a collection of Workflow/Transaction Data (WTD) 222i, the telephone exchange system (PBX) 116 is assigned a collection of Agent Contract Data (ACD) 216i, the CRC 124 is assigned a collection of data in a Call Relationship Repository (CRR) 224i, and the VRU 126 is assigned a collection of Recorded Samples and Token Links (RSTL) 226i.

With the help of the diagrams of the system in FIGS. 1 and 2, a process sequence to manage and connect a call will be described below.

If a caller's call is received by the call center 110 via the PBX 116 or the router 112, and it is not possible to assign it to an incident or a responsible agent, the call will be connected to an available agent according to a queuing routine not considered here, via an IVR process if applicable. In the process, the available agent will be defined as the responsible agent. An incident will be created as WTD 222i and stored in the WCS 122. At the same time, an ACD 216i will be created for the responsible agent, and added in the PBX 116. Hereinafter, the responsible agent will be known simply as "the agent."

During the conversation, it becomes clear that subsequent conversations will likely be necessary. At that point, the agent uses a mouse click, key input, voice command, or similar action on the agent workstation 130 (FIG. 1) to create, in the CRC 124, a relationship between the incident (WTD 222i) and the contract file ACD 216i of the agent, and store it as CRR 224i, and to create a token that can be used to address this relationship. In other words, the token has to be provided in order for the agent and the incident to be able to be identified subsequently in the workflow of the IT system. However, the token itself does not contain any connection or personal data.

The token can be a special phone number, a key, etc. If the token is generated with enough "randomness" (hash value), then misuse (use of adjacent numbers) is unlikely. It is also possible to analyze the caller's number (calling party number) when generating the token to only allow calls from the original communication device (initiating the first call). It is recognized that this analysis can only be used in applications where the caller does not have to remain anonymous.

The rest of the process, including the form and content of the token depends on the terminal that the caller used for the call.

1. Preparing and Activating the Token

If the caller called the call center using a high-tech terminal capable of using a cookie, like the IP terminal 181, representing a web browser here, an IP telephone, an Internet-capable cell phone (smartphone), a tablet PC, etc., the token will be embedded in a cookie (as a cookie token) 281*a*. The token will be provided to the caller as a cookie token 281*a* in this form. The cookie will automatically be saved to the caller's terminal 281, and it is programmed to be invoked automatically when calling the call center 100 again. This will activate the token. Activating the token, in this case, means that the token will be transmitted when calling the call center 100 again. This can take place without the caller's knowledge, or it can notify the caller.

If the caller called from a high-tech terminal capable of using SMS, like the IP terminal 181, the token can be embedded in an SMS rather than a cookie, and it can be provided to the caller as an SMS token 281*b* in this form. The caller sends a reply to the SMS (the SMS token 281*b*) to the call center to activate the token. This will initiate a return call to the call center 100 on the caller's behalf using the phone number or URL contained in the SMS token 281*b*.

If the caller called from a low-tech terminal with the ability to show messages on a display, etc., like a TDMA terminal 182 in place of a landline telephone, cell phone, etc., the token will be converted into a TDMA-coded signal sequence with the character code as a code token (ASCII code, etc.) 282, and transmitted to the terminal in a form that causes the terminal 182 to show the signal sequence as a character string on the display, etc. The caller will be prompted to take note of the character string appearing on the display. The token can be a special phone number or another character string. When calling back, the caller either chooses the special phone number or enters the token via DTMF.

If it is not possible or undesired to display information on the TDMA terminal 182 or another low-tech terminal, the code token 282*b* will be read out to the caller or shared via a spoken message, and the caller will be prompted to note the shared character string. The token can be a special phone number or another character string. When calling back, the caller either chooses the special phone number or enters the token via DTMF. This procedure is also offered when analog or public telephones are used as the terminal.

If the caller informs the agent that he or she cannot take note of the character string, or the caller called from an analog terminal 183 or a terminal of a type that cannot be determined, the agent can arrange for the token to be generated as a voice token 285 that is not directly delivered to the caller. Rather, the caller will be prompted to speak a sentence into the terminal 183 that he or she will remember (passphrase) 290 to identify this incident. The VRU analyzes this voice sample and records it or the data obtained such that the voice token 285 can be uniquely identified at a later time. When calling back, the customer will repeat the specified text for the voice sample (passphrase) 290. The VRU 126 will analyze this new voice sample and compare it with the voice samples stored in the RSTL 226*i*. If the VRU 126 finds a match, it will access the token link stored in the matching RSTL 226*i*, which will activate the voice token 285. In other words, the voice token 285 will remain in the call center, and the caller will subsequently receive indirect access to the token by storing a voice sample during the initial conversation, since he or she will be identified by the system using the voice sample, and his or her token can be activated. In principal, this can also take place with a disguised voice, which is particularly useful in applications where the anonymity of the caller is important. This method also has the advantage that the customer can determine a recognition text that is easy for him or her to remember for the incident (e.g., "my PC is broken").

2. Analyzing the Token

When the CRC 124 determines that the token is valid, the matching relationship (CRR) 224*i* will patch the caller directly through to the agent (or the agent's queue). Since the token is available in the system when the agent answers the call, the documentation for the corresponding incident 222*i* can be retrieved from the WCS 122 and displayed directly on the agent's monitor (workstation 130).

In other words, during the next call to the call center about the same incident, the token can either be specified or used by the caller, or the caller can be identified by his or her voice (matching with the voice sample, e.g., "my PC is broken"). This allows the connection to be established with the correct agent, and the correct incident (WTD) 222*i* to automatically be displayed on the workstation 130 from the WCS 122. If the responsible agent is on vacation or sick, for example, a proxy arrangement can be configured in the system and accessed. Since the agent is contacted directly, the following would also be possible:

Initiating an automatic call-back if the responsible agent is busy (if anonymity is not required in the specific case).

Setting up a special queue for the agent, so the customer can wait until the agent is available instead of being turned away if he or she is busy.

As soon as the incident is closed, the agent can mark the token as invalid, and a subsequent call using this token would be treated as a call without a token, and routed to the queue as normal. It can also be marked as invalid automatically by the system, e.g., when an incident (ticket) is closed, after a specific time without another call. The agent could also specify a waiting period during which the token should still be active, but the token will automatically be marked as invalid if another call is not received and the waiting period elapses. In other words, the agent finalizes the workflow, since to the best of his or her knowledge, everything has been attended to, but the token is still maintained for a period just in case the customer does in fact call back again. The token can also be marked as invalid by deleting the CRR 224*i* or the entire incident 222*i*, or leaving a comment in the CRR 224*i* or the incident 222*i* that indicates it is invalid.

The procedure described above is characterized by the fact that both an identity of a person responsible (agent), as well as the incident is linked in a token that cannot be further interpreted by the caller, and this can either be forwarded to the caller (customer) without the caller being able—without a current reason—to reach the agent directly, or it can remain in the system and be accessed indirectly by voice. The token is typically deleted when the work (incident) is finished, but it can also be marked as invalid beforehand by the agent (e.g., if harassed, insulted) to cut off the direct path. The incident and agent can be accessed via the token, but without direct mutual interaction of the workflow and agent accessibility. The technical device implementation is based on a series of common technical components that are enhanced with a new "Call Relationship Controller" (CRC 124), which coordinates the other components as described. This provides the following advantages:

a) The agent and his or her direct phone number can remain anonymous, even though the agent can be reached directly by "his" or "her" current customer.

b) The customer can remain anonymous, even though he or she can directly reach "his" or "her" agent, and while preserving the anonymity he or she can automatically.

c) The agent can get the documentation displayed on the current incident. This would be possible by using the caller number only, for example, if the customer:
   i) were not anonymous,
   ii) currently had only one incident open in the same call center, and
   iii) could always be identified via the same caller number.

d) The direct accessibility can also remain in place for a defined period after the incident has been closed.

Unless the originally used caller terminal has to be used for authentication for security purposes, the token (cookie, URL) can be transferred to another communication device to allow, for example, for subsequent calls to be made from mobile terminals even if the initial call was made on a landline (e.g., via PC/mobile sync).

The procedure according to the invention can be used to process calls from call center to call center in the way described, where a phone number is not generally assigned to an agent.

Since the procedure is designed to be independent from determining the caller's phone number (unless one specifically wants to incorporate the number to increase security against misuse), the procedure according to the invention can also be used if the caller utilizes Calling Line Identification Restriction (CLIR feature).

The information can be transmitted via existing means (ISDN, H.323, SIP, http, etc.), so standardization is not necessary. In terms of cross-manufacturer availability of the solution, on the other hand, standardization would be helpful and desirable. Particularly if agents are working for multiple call centers simultaneously, standardized signaling could bring with it advantages.

The invention was predominantly described for the case of an—also physical—organizational unit where all of the agents are connected to one another in a local network. The invention can also be used on a so-called virtual call center, where all or some agents work on an external workstation, either at their home or while traveling, and are connected to the call center computer via the external communication network. The advantages of the invention are also achieved in this case, and it is particularly important in this case that the agents can be reached, but that their contact data is not disclosed. A call that is assigned to an external agent according to the token will then conceal the details as it connects the caller to the external agent.

The characteristics of the invention described in reference to the illustrated embodiments can also be present in other embodiments of the invention, unless otherwise indicated or intrinsically prohibited for technical reasons.

What is claimed is:

1. A method for managing communication between a caller and a call center, comprising
    assigning a call center agent to receive a first phone call from a caller;
    creating a relationship between the call center agent and an incident associated with the first phone call;
    generating a token during the first phone call so that personal information of the call center agent and contact information for the call center agent are not included in the token;
    making the token available to be activated to initiate resumption of contact between the caller and the call center agent in which voice communication is exchangeable between the caller and the call center agent or the caller and a proxy of the call center agent so the token can be activated for resumption of contact with the call center relating to the incident by a process comprising:
        transmitting the generated token to a caller terminal for storage of the token in the caller terminal, the token being a data structure storable in non-transitory memory of the caller terminal, and
    connecting the caller with the agent or a proxy of the agent in a second phone call in response to activation of the token by the caller terminal, the second phone call occurring after the first phone call, the connecting of the caller with one of the agent and the proxy of the agent in response to activation of the token by the caller terminal to resume contact relating to the incident between the caller and the call center via the second phone call comprising:
        receiving the token from the caller terminal during the second phone call or during initiation of the second phone call.

2. The method of claim 1 wherein the token is a cookie for storage on the memory of the caller terminal.

3. The method of claim 2 wherein the cookie is received from the caller terminal when the caller terminal calls the call center to initiate the second phone call.

4. The method of claim 1 wherein the token is a first short message service ("SMS") message, the method comprising the call center receiving from the caller terminal a second SMS as a reply to the first SMS message.

5. The method of claim 4 wherein the second SMS message triggers a call back from the call center to the caller terminal to establish the second call between the caller and the agent.

6. The method of claim 1 wherein the token is a character string in a form that can be seen or heard.

7. The method of claim 1 wherein the token contains a special phone number that is selectable to initiate the second phone call and connect to the agent.

8. The method of claim 1 where the token is generated as a specific voice token and wherein the generating of the token comprises:
    prompting the caller to save a voice sample, wherein the voice sample contains a passphrase specified to the caller; and
    saving the stored voice sample together with a link to the voice token at the call center; and
    wherein the activation of the token comprises:
        requesting the passphrase from the caller when contact is resumed by the caller via the second phone call, and
        selecting a link to the voice token at the call center during the second phone call when a passphrase spoken by the caller during the second phone call matches the passphrase of the voice sample to establish a direct connection between the agent and the caller for the second phone call.

9. The method of claim 1 comprising receiving information on the incident by the agent upon activation of the token during the second phone call.

10. The method of claim 1 comprising invalidating the token when the incident is marked as closed.

11. The method of claim 10 wherein the invalidating of the token occurs in response to input received from the agent.

12. The method of claim 10 wherein the token is invalidated after a selected waiting period.

13. The method of claim 12 wherein the waiting period is preset for selected tokens.

14. The method of claim 1 wherein the caller is connected to the agent during the second phone call.

15. The method of claim 1 further comprising:
displaying information relating to the incident stored at the call center on a monitor associated with the agent during the second phone call.

16. The method of claim 1 wherein the token is configured such that a direct phone number of the agent is anonymous.

17. A method for managing communication between a caller and a call center, comprising
assigning a call center agent to receive a first phone call from a caller;
creating a relationship between the call center agent and an incident associated with the first phone call;
generating a token during the first phone call so that personal information of the call center agent and contact information for the call center agent are not included in the token;
making the token available to be activated to initiate resumption of contact between the caller and the call center agent in which voice communication is exchangeable between the caller and the call center agent or the caller and a proxy of the call center agent so the token can be activated for resumption of contact with the call center relating to the incident by a process comprising:
transmitting the generated token to a first caller terminal for storage of the token in the first caller terminal, the token being a data structure storable in non-transitory memory of the first caller terminal,
the first caller terminal sending the token to a second caller terminal for storage in non-transitory memory of the second caller terminal; and
connecting of the caller with one of the agent and the proxy of the agent in response to activation of the token to resume contact relating to the incident between the caller and the call center via the second phone call by a process comprising:
receiving, from the second caller terminal, the token during the second phone call or during initiation of the second phone call.

18. The method of claim 17 wherein the connecting of the caller connects the caller to the agent during the second phone call;
wherein the receiving of the token by the call center occurs during the second phone call; and
wherein the token is configured such that a direct phone number of the agent is anonymous.

* * * * *